United States Patent [19]

Kendall

[11] Patent Number: 5,253,424
[45] Date of Patent: Oct. 19, 1993

[54] FLUX-GATE SENSOR MOUNTING AND METHOD

[75] Inventor: Jeffrey M. Kendall, Detroit, Mich.

[73] Assignee: Chrysler Corporation, Highland Park, Mich.

[21] Appl. No.: 815,265

[22] Filed: Dec. 27, 1991

[51] Int. Cl.[5] .................. G01C 17/30; G01C 17/38; G01C 17/10

[52] U.S. Cl. .................. 33/361; 33/355 R; 33/356

[58] Field of Search .............. 33/355 R, 361, 356, 33/357, 358

[56] References Cited

U.S. PATENT DOCUMENTS

| | | |
|---|---|---|
| 3,899,834 | 8/1975 | Harrison, Jr. . |
| 3,905,121 | 9/1975 | Takeda ........................ 33/361 |
| 3,991,361 | 11/1976 | Mattern et al. . |
| 4,373,271 | 2/1983 | Nitz ........................... 33/361 |
| 4,424,631 | 1/1984 | Franks . |
| 4,425,717 | 1/1984 | Marcus . |
| 4,505,054 | 3/1985 | Clark et al. . |
| 4,546,551 | 10/1985 | Franks . |
| 4,622,646 | 11/1986 | Waller et al. . |
| 4,622,843 | 11/1986 | Hormel ....................... 33/356 |
| 4,677,381 | 6/1987 | Geerlings . |
| 4,698,912 | 10/1987 | Fowler et al. . |
| 5,090,231 | 2/1992 | Gallagher ..................... 33/356 |
| 5,146,687 | 9/1992 | Kjellstrom .................. 33/355 R |

FOREIGN PATENT DOCUMENTS

| | | |
|---|---|---|
| 0120691 | 10/1984 | European Pat. Off. . |
| 0012508 | 2/1981 | Japan ......................... 33/361 |
| 60-135814 | 7/1985 | Japan . |
| 0207617 | 8/1989 | Japan ......................... 33/361 |
| 2056686 | 3/1981 | United Kingdom . |

*Primary Examiner*—William A. Cuchlinski, Jr.
*Assistant Examiner*—C. W. Fulton
*Attorney, Agent, or Firm*—Mark P. Calcaterra

[57] ABSTRACT

A flux-gate sensor orientation method which minimizes display jitter in electronic compasses which employ an n-point display or which calculate headings using the arctangent method. The method entails orienting the flux-gate sensor in a direction of plus or minus ±360°/2n relative to actual magnetic direction, so that instability points occur at display point boundaries. The method of the present invention finds application in microprocessor-based electronic compass systems but also makes possible the construction of a simple electronic compass employing small scale integration logic instead of a microprocessor.

12 Claims, 3 Drawing Sheets

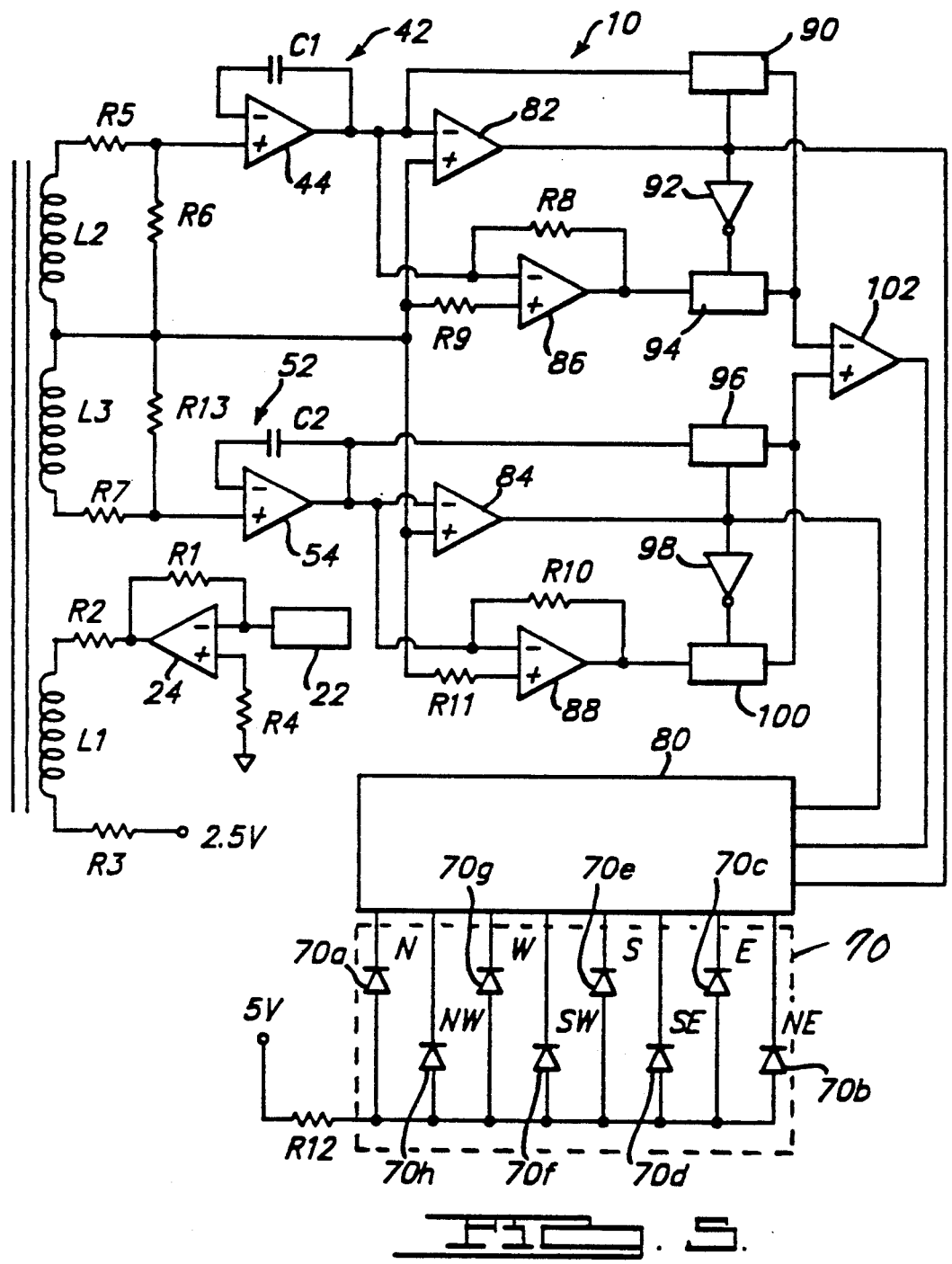

FLUX-GATE SENSOR MOUNTING AND METHOD

"Flux-Gate Sensor Mounting And Method", application Ser. No. 07/815,270.
"A Method For Interpreting Magnetic Direction For A Compass On A Vehicle", application Ser. No. 07/815,274.

The disclosures of all the applications cited above are hereby incorporated by reference and made a part hereof the same as if fully set forth herein

BACKGROUND OF THE INVENTION

1. Technical Field

The present invention relates to electronic compasses and more specifically to a method of orienting a flux-gate sensor.

2. Discussion

Normally, electronic compass systems employ a microprocessor to calculate vehicle headings based upon signals received from a magnetic flux-gate sensor. An example of a microprocessor based electronic compass can be found in U.S. Pat. No. 4,622,843 to Hormel, issued Nov. 18, 1986, entitled "Simplified Calibration Technique and Auto-Ranging Circuit for an Electronic Compass Control Circuit." This reference is hereby incorporated by reference.

The operation of the flux-gate sensors is also well documented. See for example, "Magnetic Field Sensor and Its Application to Automobiles," by Hisatsugu Itoh, February, 1980, SAE Paper 800123, pages 83-90; and "A Magnetic Heading Reference for the Electro/Fluidic Autopilot," *Sport Aviation* by Doug Garner, Part I, pages 19-26, November, 1981 and Part II, pages 20-32, and 51, December, 1981. These documents are hereby incorporated by reference.

Flux-gate sensors employ two perpendicular sense coils to sense the magnetic field of the earth. The flux-gate sensor also employs a primary winding which is used to periodically drive the core into saturation, thereby forcing the local magnetic field lines to jump in and out of the core. Voltages are induced in the sense coils, which are used to determine vehicle direction.

Traditionally, electronic compass systems determine direction by dividing the magnetic field strength in one coil by the magnetic field strength in the other coil and taking the arctangent of the quotient using a microcomputer. The problem with using the arctangent method is that the tangent is discontinuous at 90° and 270°, approaching positive infinity from below 90° and 270° and negative infinity from above 90° and 270°. For flux-gate sensor mountings in which one sense coil is oriented longitudinally within a vehicle and the other sense coil is oriented transversely with a vehicle, this discontinuity causes jitter in displayed east and west headings.

SUMMARY OF THE INVENTION

An object of the present invention is to eliminate compass jitter in vehicle, hand-held or other compasses.

Another object of the present invention is to provide a compass which can display accurate heading information and which does not use the arctangent method.

Thus, in accordance with the teachings of the present invention, a method of orienting a flux-gate sensor relative to a displayed bearing is provided. The method entails orienting the flux-gate sensor in a direction offset from the displayed bearing so that compass jitter occurs at display point or sector boundaries instead of mid sector. A general formula of ±360°/2n is used to determine the offset angle of a north-south (N/S) sense coil, where n equals the number of sectors to be displayed. The method of the present invention finds application in microprocessor-based electronic compass systems but also makes possible the construction of a simple electronic compass employing small scale integration logic instead of the microprocessor. This could be a vehicle, hand-held or other compass.

The electronic compass of the present invention employs a flux-gate sensor oriented in accordance with the method of the present invention. The output signals of the flux-gate sensor are conditioned and processed by first and second signal conditioning circuits. A logic circuit generates signals for determining compass direction. The display interface logic circuit converts digital output of the logic circuit to a form useable by a display having eight light emitting diodes (LEDs), one for each of eight compass rosetta points.

BRIEF DESCRIPTION OF THE DRAWINGS

Other objects and advantages of the invention will become apparent upon reading the following detailed description and upon reference to the drawings, in which:

FIG. 6 is an example of a physical layout of the LEDs of a display which can be used with the electronic compass of FIG. 4.

DETAILED DESCRIPTION OF THE PREFERRED EMBODIMENT

Figure 1:
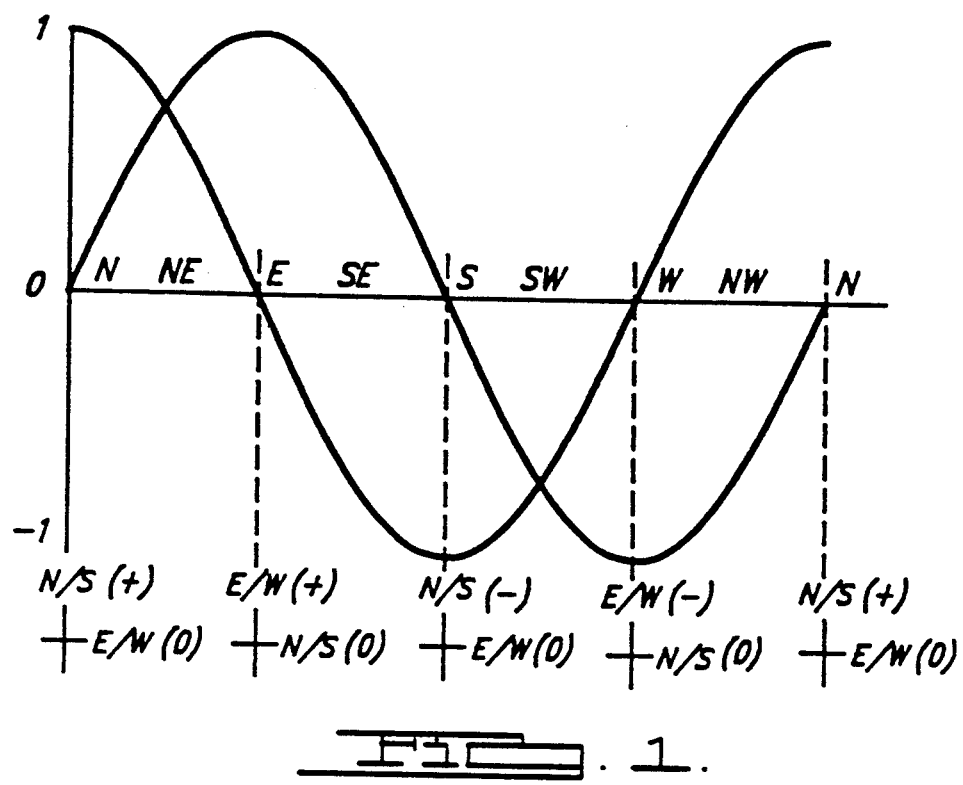
FIG. 1 contains DC output levels for the two sense coils of the flux-gate sensor, referenced to actual magnetic headings, and the flux-gate sense coil positions for actual magnetic headings of north, south, east, and west in a typical electronic compass system.

There is shown in FIG. 1 the DC output levels of an electronic compass control circuit, such as that found in the '843 patent to Hormel. The N/S and E/W waveforms represent the DC output levels of the flux-gate sensor as a function of actual magnetic direction. The N/S waveform corresponds to a cosine curve and the E/W waveform corresponds to a sine curve. The flux-gate sense coil positions with respect to the four cardinal headings of north, south, east and west are illustrated below the waveforms. For example, the north-south (N/S) sense coil is oriented in the direction of actual magnetic north when the compass is travelling in the direction of actual magnetic north. Similarly, the east-west (E/W) sense coil is oriented in the direction of actual magnetic east when the compass is travelling in the direction of actual magnetic east. The sign of the voltages across the sense coils are represented as positive (+), negative (−), or zero (0), depending upon their orientation.

Figure 2:
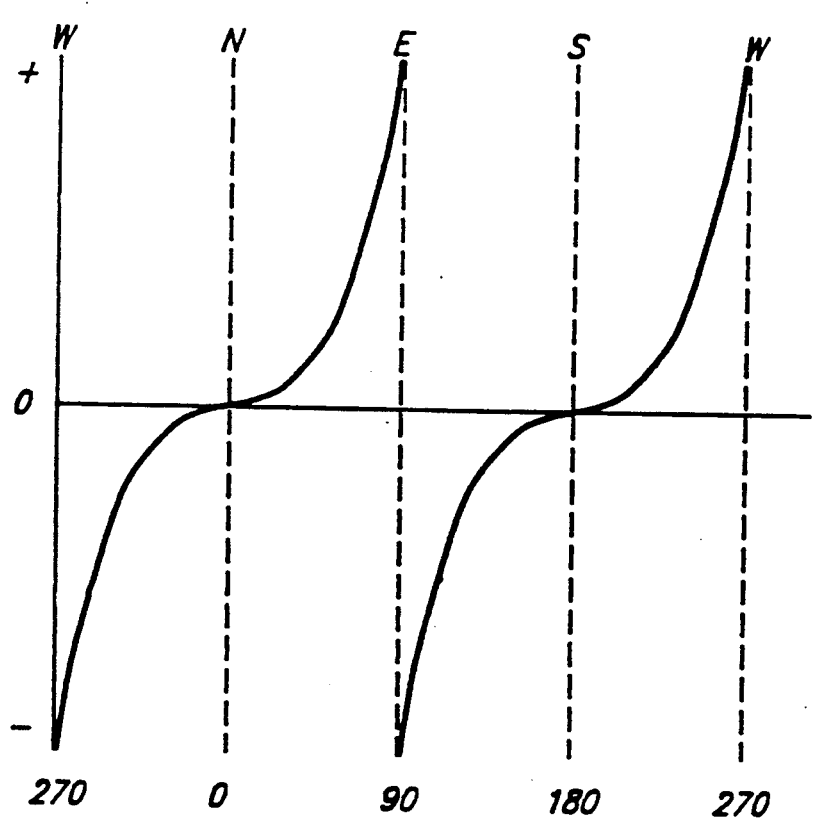
FIG. 2 contains a graph of the arctangent function and the corresponding flux-gate sensor coil positions and voltage polarities.

Turning now to FIG. 2 there is shown a graph of the arctangent function. At a heading of east, a discontinuity in the tangent curve causes instability in the arctangent. The voltage across the E/W sense coil fluxuates between very large positive and very large negative. Likewise, on a heading of west, a second large instability exists as the voltage across the E/W sense coil fluxuates between very large negative and very large positive.

Under the method of the present invention, the flux-gate sense coils are rotated relative to their positions in FIG. 1. The offset angle is determined by the number of sectors into which the compass rose is to be divided. For a four-sector compass employing the sectors north, east, south, and west, an offset angle of 45° places the instability points at the boundaries between east and southeast, and west and northwest. An offset angle of −45° places the instability points at the boundaries between east and northeast and west and southwest. In general, the formula $$\text{offset} = \pm 360°/2n$$

can be employed to determine the offset angle for the first sense coil, where n is the number of sectors.

Figure 3:
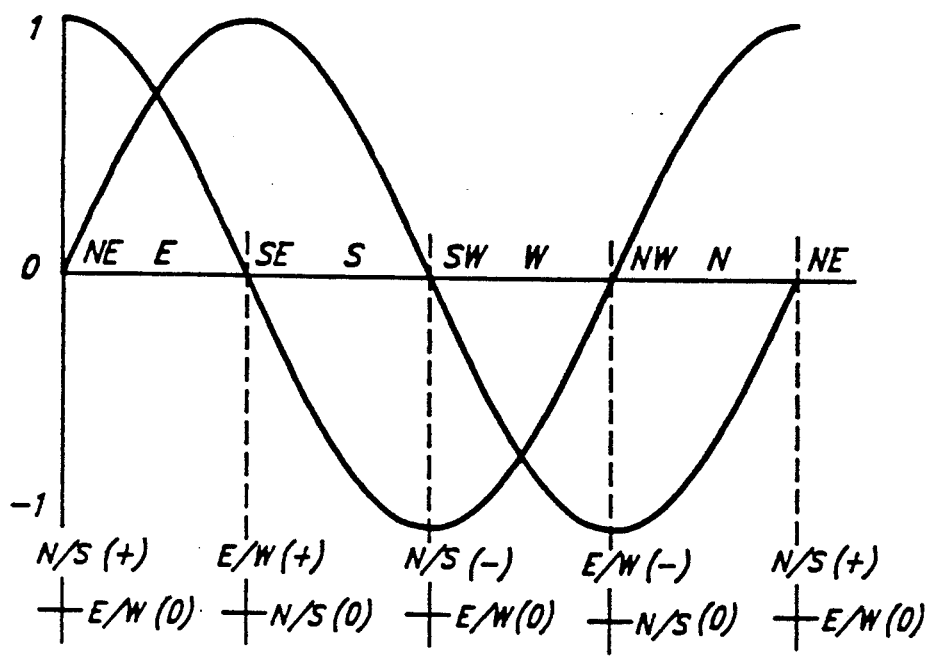
FIG. 3 contains the same DC output levels as FIG. 1, except offset 22.5° with respect to actual magnetic headings, and the flux-gate sense coil positions under a preferred method of the present invention.

As shown in FIG. 3, the offset angle of 22.5 degrees is chosen for an eight sector compass. Thus, for the eight rosetta points or sectors, north, northeast, east, southeast, west, southwest, west, and northwest, the instability points occur at the rosetta point boundary between east and southeast and between west and northwest instead of the mid-point of the east and west rosetta points. Compass jitter on east and west headings is minimized for compasses having any number of sectors by selecting an offset angle that will place the instability points at the nearest east and west sector boundaries.

The method of the present invention makes possible a simple electronic compass using small scale integration (SSI) logic instead of a microprocessor. Table I below gives data for an 8-point compass:

Using the offset voltages or the graph of FIG. 3, one can construct a logic table as illustrated in Table I. For an eight-sector compass, the logic Table has three columns labeled with the conditions N/S>E/W, N/S>0, and E/W>0. The output of these conditions is one (1) when satisfied. Altogether there are eight 3-digit logic values, one for each of the eight rosetta points. Similarly, logic tables can be constructed for compasses having any number of sectors.

Advantageously, due to the 22.5° offset of the flux-gate sensor, the transition from one logic value to the next occurs at the rosetta point boundaries. The 22.5° offset minimizes compass jitter from any instabilities from these transitions.

Figure 4:
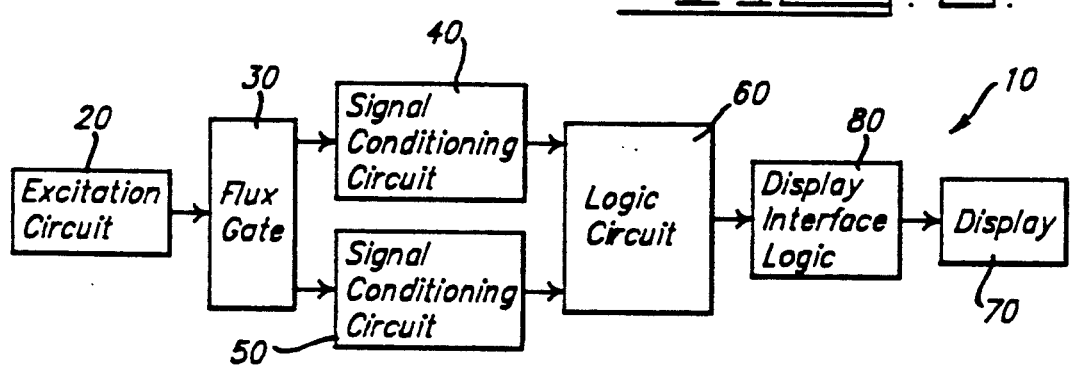
FIG. 4 is a block diagram of an electronic compass system incorporating the method of the present invention.

Turning now to FIG. 4, there is shown a block diagram of the simple electronic compass 10 made possible by the method of the present invention. An excitation circuit 20 generates a primary or drive signal to periodically drive the primary coil of a flux-gate 30 into saturation. Two signal conditioning circuits 40 and 50, one for each sense coil, process the sense coil waveforms and contain integrator circuits which generate outputs corresponding to the N/S and E/W DC output level waveforms.

A logic circuit 60 determines headings. Heading information is not obtained using the arctangent method. A small scale integration (SSI) logic circuit is employed. Heading is displayed by a display 70 after being processed by a display interface logic circuit 80.

Figure 5:
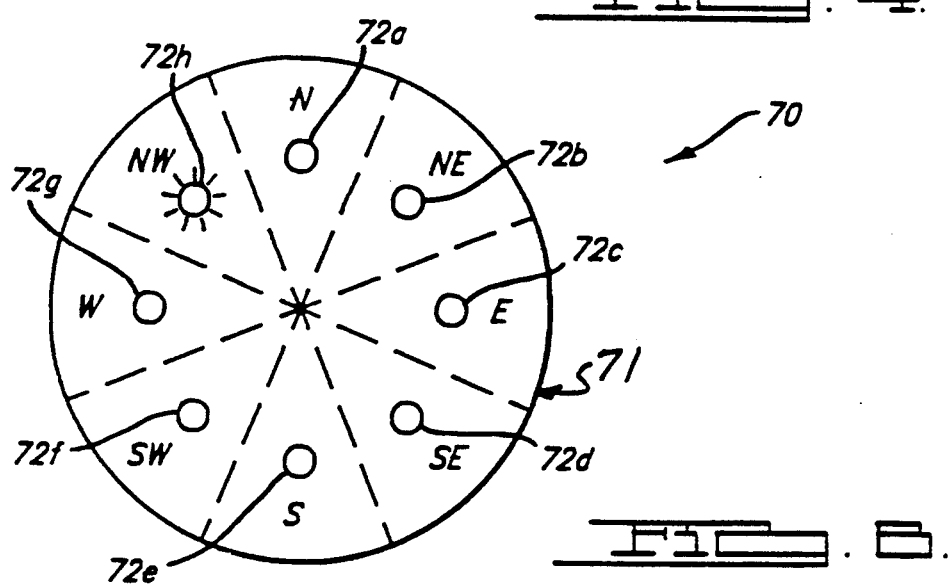
FIG. 5 is a detailed schematic of the electronic compass system of FIG. 4.

In. FIG. 5, the electronic compass 10 for an eight-sector compass is shown in more detail. The excitation circuit 20 employs a crystal oscillator 22 which is coupled to the negative terminal of an operational amplifier 24. The positive terminal is grounded. Operational amplifier 24 works in conjunction with resistors R1 and R4 to invert the oscillator signal. Resistors R2 and R3 establish the proper current through primary coil L1 to ensure saturation of the core 26. The oscillator signal is referenced to 2.5 volts.

The flux-gate 30 includes sense coils L2 and L3. These coils are tied to a common junction of 2.5 volts.

TABLE I

| Actual | | Sense Coil Outputs w/o Offset | | Sense Coil Outputs w/Offset | | Logic Values | | | Display |
|---|---|---|---|---|---|---|---|---|---|
| | Heading | N/S | E/W | N/S | E/W | N/S > E/W | N/S > 0 | E/W > 0 | Hdg |
| N  | 0     | 1       | 0       | 0.92387 | −0.3826 | 1 | 1 | 0 | N  |
| N  | 22.5  | 0.92387 | 0.38268 | 1       | 0       | 1 | 1 | 0 | N  |
| NE | 45    | 0.70710 | 0.70710 | 0.92387 | 0.38268 | 1 | 1 | 1 | NE |
| NE | 67.5  | 0.38268 | 0.92387 | 0.70710 | 0.70720 | 1 | 1 | 1 | NE |
| E  | 90    | 0       | 1       | 0.38268 | 0.92387 | 0 | 1 | 1 | E  |
| E  | 112.5 | −0.3826 | 0.92387 | 0       | 1       | 0 | 1 | 1 | E  |
| SE | 135   | −0.7071 | 0.70710 | −0.3826 | 0.92387 | 0 | 0 | 1 | SE |
| SE | 157.5 | −0.9238 | 0.38268 | −0.7071 | 0.70710 | 0 | 0 | 1 | SE |
| S  | 180   | −1      | 0       | −0.9238 | 0.38268 | 1 | 0 | 1 | S  |
| S  | 202.5 | −0.9238 | −0.3826 | −1      | 0       | 1 | 0 | 1 | S  |
| SW | 225   | −0.7071 | −0.7071 | −0.9238 | −0.3826 | 1 | 0 | 0 | SW |
| SW | 247.5 | −0.3826 | −0.9238 | −0.7071 | −0.7071 | 1 | 0 | 0 | SW |
| W  | 270   | 0       | −1      | −0.3826 | −0.9238 | 0 | 0 | 0 | W  |
| W  | 292.5 | 0.38268 | −0.9238 | 0       | −1      | 0 | 0 | 0 | W  |
| NW | 315   | 0.70710 | −0.7071 | 0.38268 | −0.9238 | 0 | 1 | 0 | NW |
| NW | 337.5 | 0.92387 | −0.3826 | 0.70710 | −0.7071 | 0 | 1 | 0 | NW |

Actual headings of the compass are listed in terms of rosetta points and degrees. Sense coil output voltages without the 22.5° offset for these headings are also listed. For the same actual headings, sense coil output voltages with the 22.5° offset are next listed. It should be appreciated that if more than eight sectors are to be used, additional sense coils may be required.

The signal conditioning circuits 40 and 50 each employ integrator circuits 42 and 52. Integrator 42 employs operational amplifier 44 and capacitor C1 while integrator 52 employs operational amplifier 54 and capacitor C2. Resistor combinations R5, R6 and R7, R13 are voltage divider networks.

The logic circuit 60 employs a series of comparators to generate a 3-digit logic value corresponding to the conditions in Table I. The N/S waveform is coupled to a first comparator 82, where it is compared with the reference voltage of 2.5 volts. This voltage is used as a reference because the sense coils are tied to a common voltage of 2.5 volts. The comparator 82 produces a high output when the voltage across the N/S sense coil is greater than 2.5 volts and a low output when the voltage is less than 2.5 volts. It can be readily seen that the output of comparator 82 also identifies the positive and negative halves of the N/S waveform in FIG. 3.

The E/W waveform is similarly processed by comparator 84. A high output is produced when the voltage across the E/W sense coil is greater than 2.5 volts and a low output is produced when the voltage is less than 2.5 volts.

To determine when the first condition is satisfied, namely when the magnitude of the N/S voltage is greater than the magnitude of the E/W voltage, a comparator 102 is used to compare the N/S and E/W waveforms after they have been full-wave rectified. Operational amplifier 86 is used in combination with resistors R8 and R9 to invert the N/S waveform. Likewise operational amplifier 88 works in combination with resistors R10 and R11 to invert the E/W waveform.

The N/S waveform, the N/S>0 waveform, and the inverted N/S waveform are used to generate the absolute value of the N/S waveform. The N/S>0 waveform is used to clock the N/S waveform through one switch 90 of a quad bilateral switch. The N/S waveform is delayed a half cycle by Schmitt Trigger 92 and the delayed waveform is used to clock the inverted N/S waveform through a second switch 94 of the quad bilateral switch. When combined, the output waveforms of switches 90 and 94 produce a full-wave rectified N/S waveform.

In a similar manner the E/W waveform, the E/W>0 waveform, and the inverted E/W waveform are used to generate the absolute value of the E/W waveform. The E/W>0 waveform is used to clock the E/W waveform through a third switch 96 of a quad bilateral switch. The E/W 20 waveform is delayed by Schmitt Trigger 98 and used to clock the inverted E/W waveform through a fourth switch 100 of the quad bilateral switch. When combined, the output waveforms of switches 96 and 100 produce a full-wave rectified E/W waveform.

The magnitude of the N/S waveform is compared with the magnitude of the E/W waveform at comparator 102. When the magnitude of the N/S waveform is greater than the magnitude of the E/W waveform, comparator 102 generates a high output. Together with the E/W>0 output and the N/S>0 output, the N/S>E/W output is coupled to the display interface logic circuit 80.

In this embodiment, the display interface logic circuit 80 is a commercially available octal decoder. Eight light-emitting diodes (LEDs) 72(a–h) of display 70 receive 5 volt power through current limiting resistor R12.

In FIG. 6, an example of a physical layout of display 70 is shown. A compass rose 71 includes n LEDs, one for each of the n sectors. In this embodiment the 8 LEDs 72a–h are each independently associated with the eight headings, that is, north, northeast, east, southeast, south, southwest, west, and northwest.

The compass 10 of FIG. 5 is intended to give general heading information. It finds particular applications in hand-held compasses. It is not suited for use near ferrous materials, such as those found in most automobiles because the SSI logic is incapable of compensating for magnetic variance or the vehicle's magnetic field; however, it is accurate when employed in plastic vehicles or containers.

Although the invention has been described with particular reference to certain preferred embodiments thereof, variations and modifications can be effected within the spirit and scope of the following claims.

What is claimed is:

1. In an electronic compass system, including a flux-gate sensor having first and second orthogonal sense coils, said electronic compass using the arctangent function to calculate headings and displaying n sectors having n boundaries separated by a fixed number of degrees, wherein said boundaries are offset with respect to actual magnetic directions, a method of orienting a flux-gate sensor relative to actual magnetic directions to minimize display jitter between the boundaries, said method comprising:
   (a) orienting the display with actual magnetic directions; and
   (b) orienting the first and second sense coils along four of said boundaries.

2. The method as recited in claim 1, further comprising:
   (c) generating a logic table having a plurality of values, each said value of the logic table being associated with a sector; and
   (d) determining compass headings from said logic table.

3. The method as recited in claim 1 wherein step (b) comprises orienting the first sense coil plus or minus $\pm 360°/2n$ degrees relative to actual magnetic directions.

4. The method as recited in claim 3, wherein for n=8, the first sense coil is orientated $\pm 22.5°$ relative to actual magnetic directions.

5. An electronic compass system for use in areas far enough from ferrous metals so as to be unaffected by the magnetic fields associated with such metals, comprising:
   (a) a flux-gate sensor having perpendicular first and second sense coils, each said sense coil being operable to generate a signal thereacross;
   (b) first circuit means for conditioning and processing the signal across the first sense coil and for producing a first direct current output signal;
   (c) second circuit means for conditioning and processing the signal across the second sense coil and for producing a second direct current output signal;
   (d) logic means, coupled to said first and second circuit means and having an output for determining compass heading using said first and second direct current output signals;
   (e) display interface means coupled to said logic means for converting the output of said logic means to a signal for display; and
   (f) display means coupled to said display interface means for displaying compass headings, said display means being divided into n sectors having n boundaries separated by a fixed number of degrees, wherein said boundaries are offset with respect to actual magnetic directions;
said first and second sense coils being oriented along four of said sector boundaries.

6. The electronic compass system of claim 5 wherein said first sense coil is oriented plus or minus ±360°/2n relative to actual magnetic direction.

7. The electronic compass system of claim 5 wherein said logic means comprises:
   (a) a first comparator for comparing the first direct current output signal from the first circuit means with a reference signal and for producing an output signal indicative of the polarity of the first direct output signal;
   (b) a second comparator for comparing the second direct current output signal with the reference signal and for producing an output signal indicative of the polarity of the second direct current output signal; and
   (c) a third comparator for comparing the magnitude of the first direct current output signal with the magnitude of the second direct current output signal and for producing an output indicative of the relative magnitudes of the first direct current output signal and the second direct current output signal.

8. The electronic compass system of claim 7 wherein said logic means further comprises:
   (d) a first Schmitt Trigger for delaying the first comparator output signal by a half-cycle;
   (e) a second Schmitt Trigger for delaying the second comparator output signal by a half-cycle;
   (f) first inverter means coupled to said first circuit means for inverting the first direct output signal and generating an output signal representative thereof;
   (g) second inverting means coupled to said second circuit means for inverting the second direct output signal and generating an output signal representative thereof;
   (h) a quad bilateral switch having four switches, the first switch being coupled to the first direct output signal and clocked by said first comparator output signal, the second switch being coupled to the output signal of the first inverting means and clocked by said first Schmitt Trigger output signal, the third switch being coupled to the second direct output signal and clocked by said second comparator output signal, and the fourth switch being coupled to the output signal of the second inverting means and clocked by said second Schmitt Trigger output signal, the first and second switch outputs being coupled to thereby produce a full-wave rectified first direct output signal coupled to said third comparator, and said third and fourth switch outputs being coupled to thereby produce a full-wave rectified second direct output signal to said third comparator.

9. The electronic compass system of claim 5 wherein said display means comprises a compass rose and n light-emitting diodes, one for each of the n sectors.

10. The electronic compass system of claim 9 wherein said display means comprises eight light-emitting diodes.

11. The electronic compass system of claim 5 wherein said display interface logic means comprises an octal decoder.

12. An electronic compass system for determining vehicle headings comprising:
   (a) a flux-gate sensor, having first and second orthogonal sense coils, said flux-gate sensor being oriented plus or minus ±360°/2n relative to actual magnetic directions;
   (b) signal processing means coupled to said flux-gate sensor for generating first and second output signals having information about the heading of the vehicle; and
   (c) logic means responsive to said signal processing means for determining vehicle headings.

* * * * *